J. H. SISSEL.
TRACTOR STRUCTURE.
APPLICATION FILED NOV. 26, 1920.
1,401,287.
Patented Dec. 27, 1921.
2 SHEETS—SHEET 1.
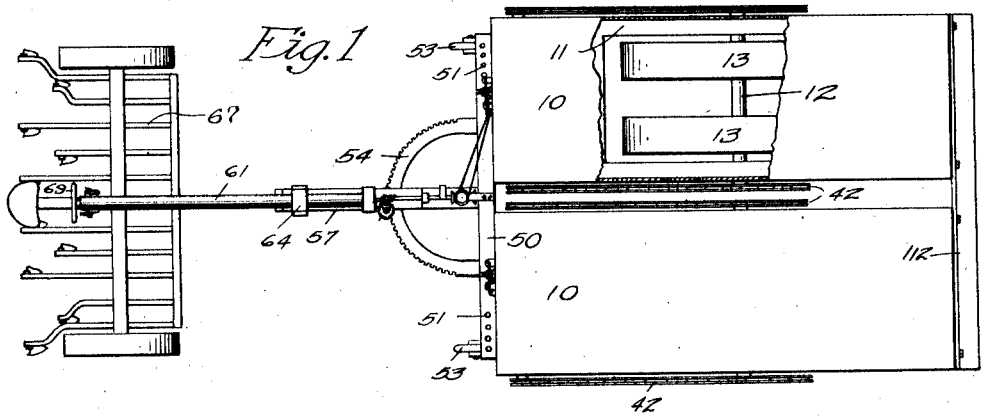
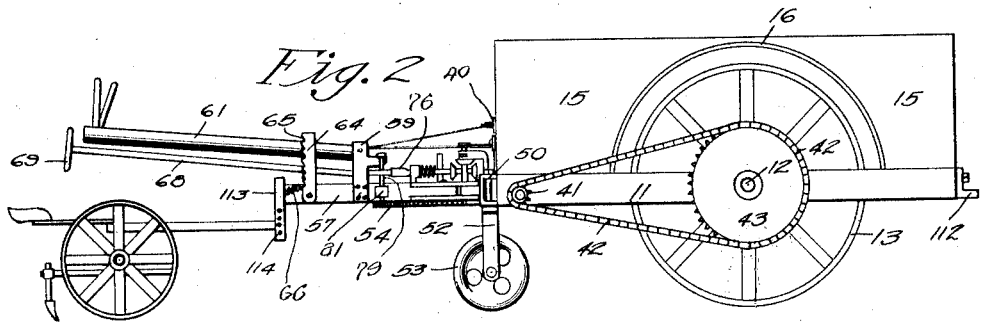
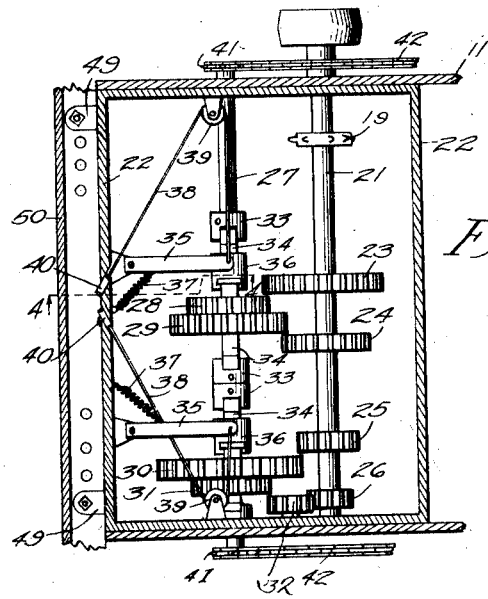
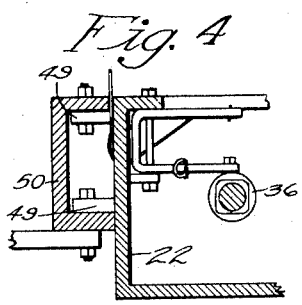
Inventor
John H. Sissel
By Bair & Freeman
Attorneys
Witness
Lynn Latta

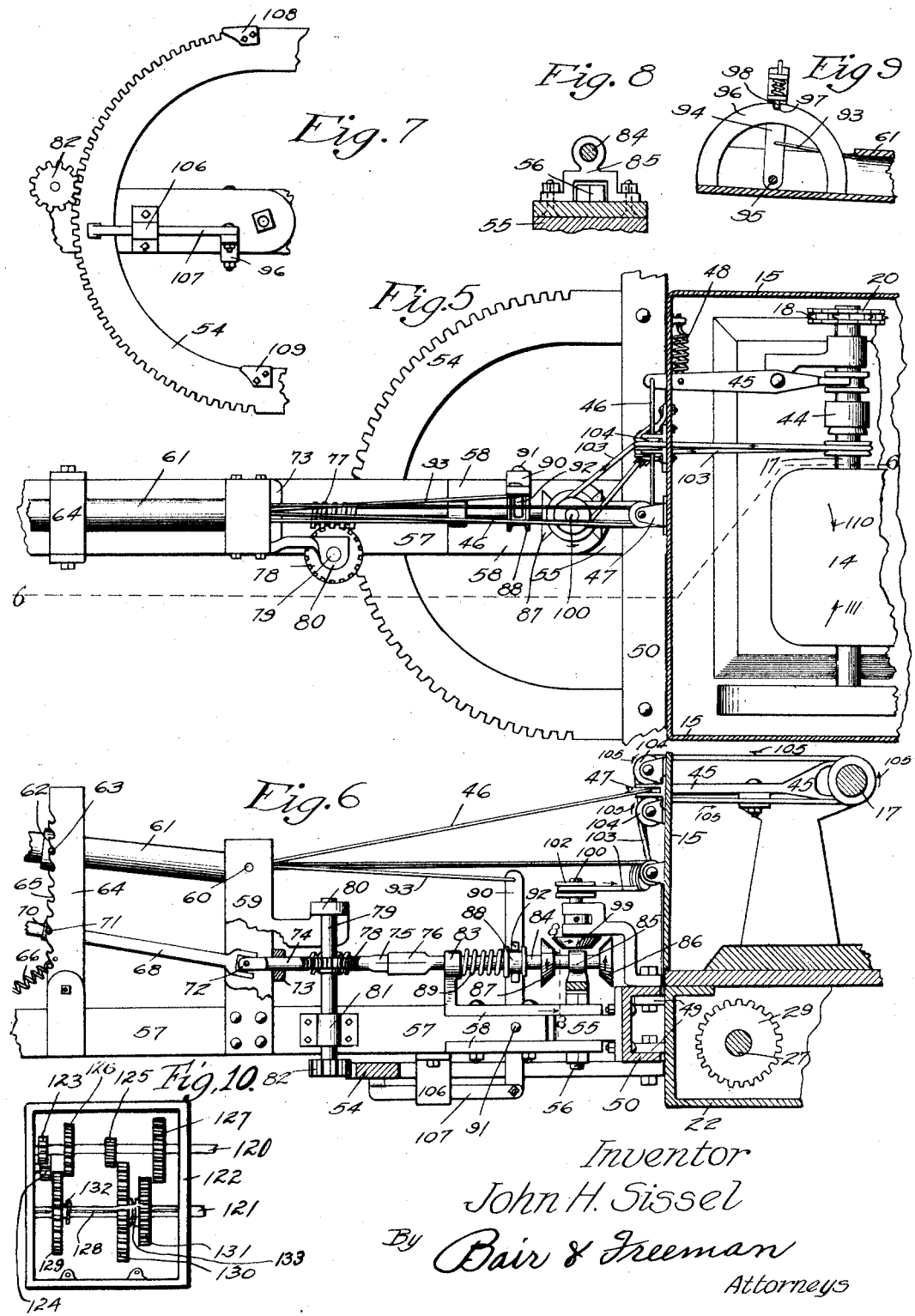

UNITED STATES PATENT OFFICE.

JOHN H. SISSEL, OF MASONVILLE, IOWA.

TRACTOR STRUCTURE.

1,401,287.  Specification of Letters Patent.  Patented Dec. 27, 1921.

Application filed November 26, 1920. Serial No. 426,530.

*To all whom it may concern:*

Be it known that I, John H. Sissel, a citizen of the United States, and a resident of Masonville, in the county of Buchanan and State of Iowa, have invented a certain new and useful Tractor Structure, of which the following is a specification.

The object of my invention is to provide a tractor, which is an improvement over my Letters Patent, issued July 13, 1920, Number 1,346,771.

Another object of my invention is to provide a steering mechanism so adapted that the motive power of the tractor engine may be used for steering the tractor proper.

Still a further object is to provide means for automatically rendering the steering mechanism inoperative when the tractor has been turned to a predetermined position.

Still a further object is to provide a manually controlled clutch lever by which the tractor may be steered in either direction from power furnished by the tractor engine.

My tractor may properly be termed a one wheel tractor which is provided with caster wheels for balancing it when not hitched or used in operation with a farm implement or wagon.

Still a further object is to provide such a steering mechanism whereby it may be used for driving a single tractor, or may be fixed to a pair of tractors which are placed side by side and both tractors be driven from the single steering mechanism.

With these and other objects in view, my invention consists in the construction, arrangement and combination of the various parts of the device, whereby the objects contemplated are attained, as hereinafter more fully set forth, pointed out in my claims, and illustrated in the accompanying drawings, in which:

Figure 1 is a top plan view of a pair of tractors placed side by side with my improved steering mechanism shown attached.

Fig. 2 is a side elevation of the same.

Fig. 3 is a sectional view through the transmission casing, showing the transmission gears.

Fig. 4 is a sectional view taken on line 4—4 of Fig. 3.

Fig. 5 is an enlarged plan view of the steering mechanism and the driving means for the same.

Fig. 6 is a sectional view taken on line 6—6 of Fig. 5.

Fig. 7 is a view of the underside of the curved rack bar and the mechanism for automatically rendering the steering mechanism inoperative.

Fig. 8 is a detail sectional view taken on the line 8—8 of Fig. 6, showing one of the bearings.

Fig. 9 is a side elevation of the lever for controlling the power driven steering mechanism; and Fig. 10 is a slightly modified form of my transmission device.

In the accompanying drawings I have used the reference numeral 10 to indicate a tractor which is provided with a frame member 11 and an axle 12.

Mounted on the axle 12 are the wheel members 13, which are both fixed to the axle and are driven as a single wheel.

Mounted on the frame is an internal combustion engine 14, which is entirely incased by a sheet metal casing 15. The casing 15 is so formed as to provide fenders 16 for the wheels 13.

The engine 14 is provided with a drive shaft 17 which is placed parallel with the axle 12. At one end of the drive shaft 17 is a sprocket 18 which is operatively connected to a sprocket 19 by means of the chain 20.

The sprocket 19 is fixed on the shaft 21, journaled in the transmission housing 22. The transmission housing is placed directly below the combustion engine 14, as illustrated in Fig. 6 of the drawings.

Fixed to the shaft 21 are the gears 23, 24 and 25 corresponding to high, intermediate and low, while the gear 26 corresponds to the reverse.

A shaft 27 is provided in the transmission housing 22, upon which are loosely and slidably mounted the gears 28, 29, 30 and 31. The gears 31 and 26 may be operatively connected together by means of the idler gear 32.

Fixed to the shaft 27 are the clutch members 33, while the gears 28, 29, 30 and 31 are fixed on co-acting clutch members 34, which are slidably mounted on the shaft 27.

In order to throw the gears into mesh for providing the various speeds I have provided the levers 35 which are U shaped in construction, as illustrated in Fig. 4 of the drawings.

The levers 35 are fixed to the collars 36 which are fixed in turn to the clutch members 34. Springs 37 are fixed to the levers 35 which will tend to throw gear 29 in mesh with gear 24, and gear 30 in mesh with gear 25.

In order to hold the levers against movement to position where the gears will mesh I have provided cables 38 which pass around pulleys 39 and 40. The cables 38 lead to a suitable lever similar to the lever construction shown in Fig. 9 of the drawings.

Means are provided for holding the lever in a certain pre-determined position which will cause the gears to remain out of mesh, but movement of either of the levers in either direction will permit the gears to mesh as desired for any desired speed.

The shaft 27 extends through the frame 11 and on each side thereof there is provided a sprocket 41, which is connected by means of a chain 42 to the sprocket 43 on the axle 12.

From the construction of the parts just described it will be seen how power is transmitted from the engine 14 to the axle 12.

In order to provide for rendering the drive shaft 17 inoperative I have provided a clutch mechanism 44 which is operated by a lever 45. Fixed to the rear end of the lever 45 is a cable 46 which passes around the pulley 47 and then rearwardly to a suitable lever. A spring 48 tends to hold the clutch in engagement so that when the cable 46 is pulled rearward the clutch mechanism 44 is rendered inoperative.

The lever (not shown) which is fixed to the end of the cable 46 may be provided with a stop, so that when the clutch is thrown out of engagement against the action of the spring 48 it may be held there.

My steering mechanism which comprises substantially a single unit may either be fixed to a single tractor, or to two tractors which are placed side by side.

In order to fix the steering mechanism to the tractor I have provided on the casing 22, of the tractor a pair of lugs 49.

Fixed to the lugs 49 is the channel shaped bar 50, which is provided at its ends with a series of openings 51 in which is mounted the shank 52 of the caster wheel 53. This tends to hold the tractor in position and to balance it when not used in connection with some other implement.

When the steering attachment is used with a single tractor as illustrated in Fig. 5 the ends of the bar 50 extend out beyond the sides of the tractor 10.

The caster wheels may be adjusted so that they may be conveniently used in a field of corn or in a field of sugar beets or some other articles which are planted in closer rows.

When the steering attachment is used for two machines its center comes directly between the two tractors, as illustrated in Fig. 1, and when used in connection with a single machine its center comes directly at a point midway between the sides of the tractor, as illustrated in Fig. 5.

Fixed to the bar 50 and extending rearwardly therefrom is the curved rack bar 54. Fixed to the bar 50 is the rearwardly extending lug 55 which is provided with an opening through which is extended a king bolt 56.

A stub tongue 57 is provided which has an upper and a lower plate 58 fixed to the forward end of the stub tongue.

The forward ends of the plates 58 are provided with openings which register with the openings in the lug 55 to receive the king bolt 56. The stub tongue 57 is provided with an upwardly extending yoke member 59 in which is pivoted at its forward end at 60 a rearwardly extending tube member 61.

The tube 61 is provided with a collar 62 which has a pair of outwardly extending pins 63.

A pivoted yoke member 64 is fixed to the stub tongue 57 slightly rearwardly of the yoke member 59 and is provided on its rear edges with the notches 65 which receive the pins 63 on the collar 62.

A spring 66 fixed to the yoke 64 and to the stub tongue 57 tends to hold the pins 63 in engagement with the notches 65. The pivot 60 and the pins 63 form the bearing members for the tube 61 so that the rear end of the tube 61 may extend rearwardly to a point adjacent to the seat of any suitable farm implement 67, as shown in Fig. 2.

A steering post 68 having the steering wheel 69 thereon is provided, which is substantially parallel with the tube 61. The post 68 is provided with a collar 70 having the pin 71 therein similar to the collar 62 and the pin 63.

The pin 71 is received in the notches 65. The forward end of the steering post 68 is provided with a universal joint 72.

From the construction of the parts just described it will be seen that the tube 61 and the steering post 68 may be raised or lowered and received in any of the notches 65 whereby it may be adjusted so as to be operated from farm implements of various heights and types.

The yoke 59 is provided with a cross piece or bearing member 73 in which is mounted the short shaft 74 which is fixed to the universal joint 72 at its rear end.

The forward end of the short shaft 74 is provided with a squared portion 75 which is received in a socket 76.

Fixed on the shaft 74 is a worm 77 which is in mesh with a worm wheel 78. The worm wheel 78 is fixed to a vertical shaft 79 which has its upper end journaled in a bearing 80 forming part of the yoke member 59 and its lower end in a bearing 81 which is fixed to the stub tongue 57.

The extreme lower end of the vertical shaft 79 is provided with a gear 82 which is in mesh with the curved rack bar 54.

From the construction of these parts it will be seen that by rotation of the steering wheel the gear 82 will be rotated.

The upper plate 58 is provided with an upwardly extending bearing 83 in which is mounted the shaft 84 upon which is formed the socket 76 heretofore referred to.

The shaft 84 has its forward end journaled in a bearing 85 which is provided with a central opening in its underside so as to permit the head of the king bolt 56 to be received therein, the bearing 85 coming directly above the pivotal point of the stub tongue 57. The bearing 85 is of the construction illustrated in Fig. 8 of the drawings.

Fixed on the shaft 84 on each side of the bearing member 85 are the disks or clutch members 86 and 87. The shaft 84 is capable of slight sliding movement within its bearing, the purpose of which will be more fully set forth.

A collar 88 is provided on the shaft 84. Received between the collar 88 and the bearing 83 is a spring 89 which yieldingly tends to move the shaft 84 forwardly.

A lever 90 pivoted to the stub tongue at 91 is provided with a pair of fingers 92 which are received in the collar 88. The upper end of the lever 90 has fixed to it a cable 93 which extends rearwardly and is received within the tube 61. The rear end of the cable 93 is fixed to a lever 94 which is pivoted at 95.

A sector 96 is fixed to the rear end of the tube 61 and is provided with a notch 97 at its center point. The lever 94 is provided with a plunger 98 which is yieldingly held in the notch 97 but which may be withdrawn when it is desired to swing the lever either forwardly or rearwardly.

A disk or clutch member 99 fixed on the shaft 100 is supported on the bar 50 by means of a curved bracket 101. The upper end of the shaft 100 is provided with a pulley wheel 102. The pulley wheel 102 is connected by means of a belt 103 to the pulley wheels 104 on the drive shaft 17 of the engine 14. The belt 103 passes around the pulley wheels 104 in the direction indicated by the arrows 105.

It will be seen that when the engine 14 is in operation that the disk or clutch member 99 will be kept rotated. Movement of the disk or clutch members 86 and 87 so that either of them will engage with the clutch member 99 will cause rotation of the shaft 84 in either direction.

When the lever 94 is in the position shown in Fig. 9 of the drawings, the members 86 and 87 will be held in the neutral position, that is not in engagement with the disk 99. But when the lever is moved forwardly the spring 89 will cause the lever 90 to be moved, and permit the disk 87 to engage the disk 99.

When the lever 94 is moved rearwardly it will cause the spring 89 to be tightened and permit the disk 86 to engage with the disk 99. In either case rotation will be applied to the shaft 84 which in turn will impart rotation to the shaft 75 through the worm and worm wheel and then to the gear 82. The gear 82 causes the tractor to be turned.

From the construction of the parts just described it will be noticed that I have provided a device that will steer the tractor by power furnished from the tractor engine.

In order to automatically throw the disks 86 or 87 out of engagement with the disk 99 I have provided the following device.

Pivoted to the lower end of the lever 90 and received within the socket 106 is a link 107. Fixed to the rack bar 54 are the cams 108 and 109, one being on the inner side of the curved rack bar, and the other being on the outside.

The link 107 as shown in Fig. 7 of the drawings is shown in its neutral position. If the disk 87 were in engagement with the disk 99 it will cause the tractor to move in the direction indicated by the arrow 110.

When the disk 86 is in engagement with the disk 99 then the tractor will move in the direction indicated by the arrow 111.

When the disks 87 and 99 are in engagement, and the tractor turning in the direction indicated by the arrow 110 then the link 107 will be moved rearwardly. When the tractor has been turned substantially a quarter of a revolution and has reached its limit of turning movement, the free end of the link 107 will engage the cam 108 which will cause the disengagement of the disks 87 and 99. The cam 109 is used for automatically rendering the disks 86 and 89 inoperative when the tractor is turning in the direction indicated by the arrow 111.

The driver who is controlling the lever 94 needs to only move the lever either forwardly or rearwardly, the remainder of the steering being done automatically.

When the disk member has been rendered inoperative by either the cams 108 or 109, the driver can then move the lever 94 back to its original or normal position.

The cables 38 which control the variable speed gearing device are fixed to a lever similar to the lever 94 as shown in Fig. 9 of the drawings.

When I drive two tractors by a single steering mechanism I fix the forward ends of the tractors together by means of an angle iron or the like 112. The rear end of the stub tongue 57 is provided with a hitching device 113 which is provided with a plurality of openings 114 whereby farm implements of various sizes may be selectively received in any of the openings 114.

In Fig. 10 I have shown a slightly modified form of my transmission device in which the shafts 120 and 121 are journaled in the housing 122. The shaft 120 is provided with a reverse gear 123 in mesh with the gear 124, which is supported on the housing 122. Mounted on the shaft 120 is a low gear 125, an intermediate gear 126 and high gear 127.

The shaft 121 is provided with a spline 128. The gears 129, 130, and 131 are slidably but non-rotatably mounted on the shaft 121. The gear 129 is provided with a grooved collar 132, and the gears 130 and 131 are formed integral and provided with a grooved portion 133 in between their adjacent surfaces.

Sliding of the gear 129 by lever as shown in Fig. 3 in either direction on the shaft 121 will either cause it to mesh with the reverse gear or intermediate gear. While sliding the gears 130 and 131 in either direction will cause either gear 130 to mesh with the low gear 125, or gear 131 to mesh with high gear 127.

The advantages of my device are that I am able to steer two tractors placed side by side by a single steering mechanism.

Another advantage is the steering of either a single or a double tractor by power furnished from the tractor itself.

Another advantage is the cam members whereby the power for steering the tractor may be rendered inoperative when the tractors have reached their limit of turning movement.

Some changes may be made in the construction and arrangement of the parts of my improved device without departing from the essential features and purposes of my invention, and it is my intention to cover by my claims any modified forms of structure or use of mechanical equivalents which may be reasonably included within their scope.

I claim as my invention:

1. In a device of the class described a pair of tractors placed side by side, a steering attachment for steering said pair of tractors said steering attachment comprising a curved rack bar fixed to the rear end of the frames of the pair of tractors a gear in mesh with said rack bar, means for imparting rotation to said gear from the engine of one of said tractors, said means including a clutch device having a pair of coacting clutch members, a lever for controlling said clutch device, the parts being so arranged that movement of the lever in either direction will impart rotation to said gear in either direction.

2. In a device of the class described a pair of tractor frames placed side by side, an axle on each frame, a wheel on each of said axles, an engine on each of said frames, means for imparting rotation to said wheels from said engines, a steering mechanism fixed to said frames for simultaneously steering said frames, a tongue pivoted to said frames for supporting the steering mechanism, said steering mechanism including a steering wheel adapted to be manually operated and a clutch device operatively connected with the engine for operating the steering mechanism from the engine independent of the operation of the steering wheel.

Des Moines, Iowa, September 28, 1920.

JOHN H. SISSEL.